UNITED STATES PATENT OFFICE.

GUSTAV PISTOR AND HEINRICH REITZ, OF GRIESHEIM-ON-THE-MAIN, GERMANY, ASSIGNORS TO THE FIRM OF CHEMISCHE FABRIK GRIESHEIM-ELEKTRON, OF FRANKFORT-ON-THE-MAIN, GERMANY.

MANUFACTURE OF CALCIUM HYPOCHLORITE.

1,236,978.  Specification of Letters Patent.  Patented Aug. 14, 1917.

No Drawing.  Application filed August 25, 1914.  Serial No. 858,517.

*To all whom it may concern:*

Be it known that GUSTAV PISTOR, director, and HEINRICH REITZ, chemist, both subjects of the German Emperor, residents of Griesheim-on-the-Main, Germany, have invented certain new and useful Improvements in the Manufacture of Calcium Hypochlorite, of which the following is a specification.

The specification of German Patent No. 195,896 discloses that on the chlorination of milk of lime beyond the usual extent basic compounds of calcium hypochlorite are first of all formed and that these are decomposed by the further passage of chlorin.

This process was carried out for instance by chlorinating the milk of lime without troubling about the precipitation of intermediate products until almost all the lime was used, and from the solution, rich in chlorin, thus obtained intermediate basic products were allowed to form by the addition of further quantities of lime and then the hypochlorite was obtained by passing through more chlorin.

It has now been found that the process can be advantageously carried out if the whole of the lime required for the production of the final product be used from the first and the addition of water be greatly restricted. If for instance, the initial product be a pulp of lime containing at most 2 parts by weight of water for 1 part of CaO (that is, 1.3 parts of $Ca(OH)_2$), it is possible to readily obtain the desired calcium hypochlorite by simply passing chlorin directly through the mixture, the said hypochlorite being precipitated in crystalline form from the highly concentrated solution. The proportions of water and lime can vary between certain limits. Too great a dilution of the lime with water should be avoided while, on the other hand, the concentration should be carried only so far that the hypochlorites are precipitated while the calcium chlorid remains in solution. Precipitation of calcium chlorid would detract from the value of the hypochlorites.

It has been found that it is of especial advantage to so carry out the process that the chlorin is not passed through the material to be reacted upon, but is forced into a closed vessel provided with a pressure gage and containing the material to be acted upon while stirring well. The great amount of lime contained in the pulp of lime then absorbs the chlorin very rapidly.

The temperature is not limited in practice so long as there is a sufficient amount of lime to prevent the decomposition of the hypochlorite formed. The higher the pressure is the higher will be the temperature, because, with increased pressure, the absorption of chlorin, and consequently the temperature of the reaction, will be increased.

In carrying out the process according to this invention it has been observed that on maintaining certain reaction temperatures the intermediate basic product is not precipitated. If on the other hand the temperature lowers, in consequence of interruption of the process, the basic compound is precipitated in considerable amounts. In such cases investigation has shown that the decomposition by chlorin of the precipitated basic product takes place only with difficulty and but slowly on the further passing in of chlorin, so that the duration of the treatment of the chlorin is greatly increased.

Good results are obtained, for instance, if the temperature at which the operation is conducted be from 35° to 45° centigrade and the pressure about 500 millimeters of water above atmospheric pressure. Toward the end of the chlorination i. e. when only a small percentage of lime is present, and no longer appears injurious for the eventual formation of the basic body, the temperature is lowered to 25° centigrade, for the special purpose of avoiding the decomposition of the hypochlorite which has formed in large quantities. As the absorption of chlorin proceeds much more slowly toward the end of the reaction, it is advisable, for the purpose of completing the chlorination rapidly to increase the pressure to about 2000 millimeters of water above atmospheric pressure. The chlorination in this mode of operation takes place in such a manner that it is usually completed in one or two hours.

The chlorination is preferably carried so far that 0.2 to 0.3 per cent. of free lime still remains in the pulp, because if the chlorination be carried farther, decomposition of the hypochlorite formed is liable to occur.

In carrying out the process in accordance with this invention it is possible, while avoiding the formation of a difficultly soluble basic body, to obtain in a very short time, a pulp of calcium hypochlorite from which, on separation of the mother lye, about 90 per cent. of the chlorin used is obtained in the form of solid and practically pure, calcium hypochlorite.

After the removal of the water of crystallization, for instance, by desiccation *in vacuo*, a product is obtained 100 pounds of which when treated with hydrochloric acid will produce the same oxidizing or bleaching effect as 80 or 90 pounds of active chlorin.

Having now particularly described and ascertained the nature of our said invention and in what manner the same is to be performed, we declare that what we claim is—

1. The process of making calcium hypochlorite which comprises treating with chlorin a mixture of water and calcium hydroxid containing not more than about 2 parts by weight of water to 1.3 parts of calcium hydroxid.

2. The process of making calcium hypochlorite which comprises treating with chlorin a mixture of water and calcium hydroxid containing not more than about 2 parts by weight of water to 1.3 parts of calcium hydroxid, and discontinuing the chlorination when the content of free calcium hydroxid has been reduced to from .2 to .3 per cent.

3. The process of making calcium hypochlorite which comprises treating with chlorin a mixture, containing initially substantially no calcium hypochlorite, of calcium hydroxid with an amount of water such that the solution of calcium hypochlorite resulting from the chlorin reaction will be so concentrated as to cause the crystallization of calcium hypochlorite therefrom.

4. The process of making calcium hypochlorite which comprises causing chlorin to react on calcium hydroxid mixed with a comparatively small amount of water, and maintaining the mixture at a temperature at which no appreciable amounts of basic compounds of calcium hypochlorite are precipitated.

5. The process of making calcium hypochlorite which comprises causing chlorin to react on calcium hydroxid mixed with a comparatively small amount of water, at a pressure substantially above that of the atmosphere.

6. The process of making calcium hypochlorite which comprises causing chlorin to react on calcium hydroxid mixed with a comparatively small amount of water, at a pressure substantially above that of the atmosphere, and maintaining the mixture at a temperature at which no appreciable amounts of basic compounds of calcium hypochlorite are precipitated.

7. The process of making calcium hypochlorite which comprises causing chlorin to react on calcium hydroxid mixed with a comparatively small amount of water, maintaining the mixture at a temperature of from about 35 to 45° C. until only a small percentage of calcium hydroxid is left, and then completing the reaction at a lower temperature.

8. The process of making calcium hypochlorite which comprises treating with chlorin a mixture of calcium hydroxid and a comparatively small amount of water, at a pressure of about 500 mm. of water above atmospheric pressure, while maintaining the mixture at a temperature between about 35 to 45° C., until only a small percentage of calcium hydroxid is left, and then completing the chlorination at a lower temperature and at an increased pressure.

In testimony whereof we have signed our names to this specification in the presence of two subscribing witnesses.

GUSTAV PISTOR.
DR. HEINRICH REITZ.

Witnesses:
ERNST NOLL,
JEAN GRUND.